Sept. 25, 1962    F. R. MURPHY    3,055,449
MOTORIZED PACK AND GAME CART
Filed Dec. 2, 1959    2 Sheets-Sheet 1
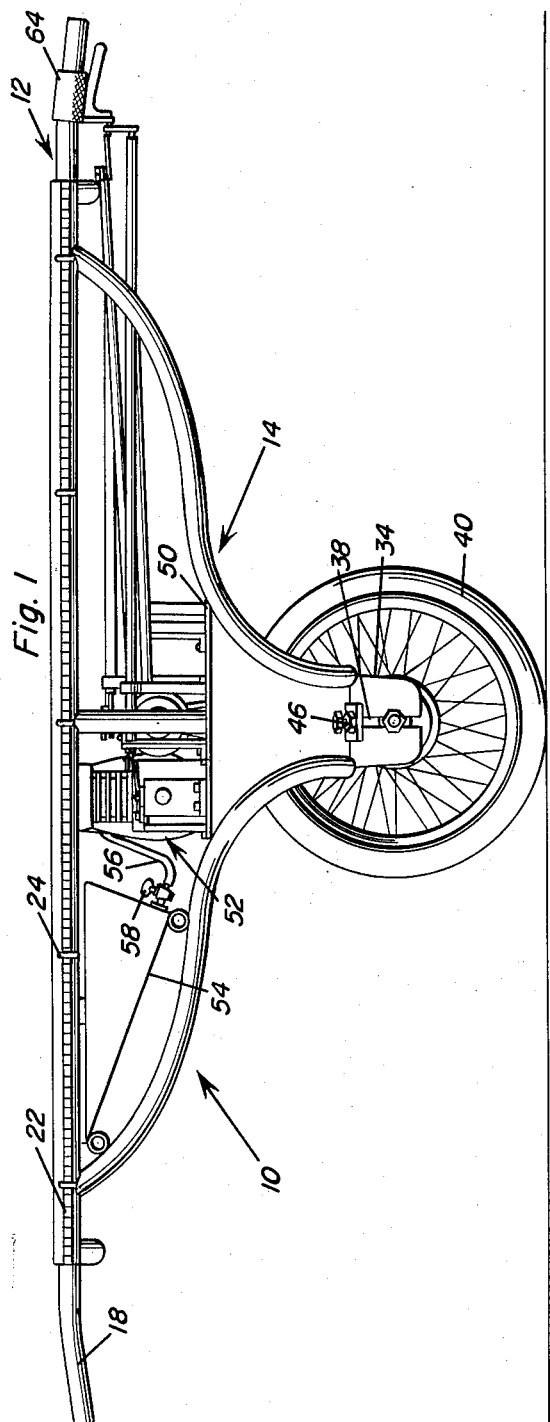
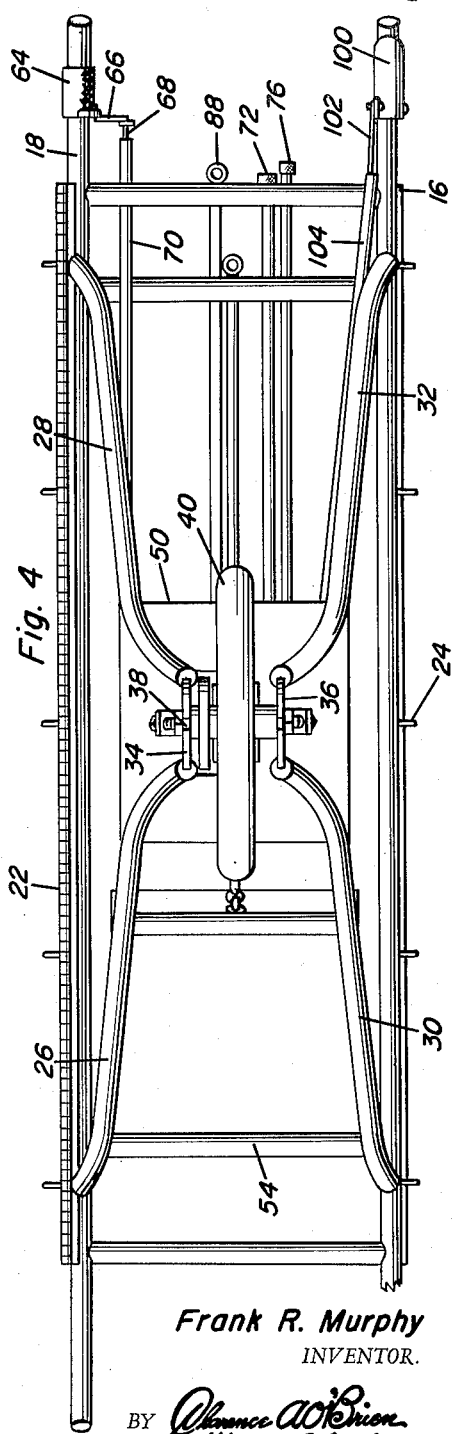
Frank R. Murphy
INVENTOR.

Sept. 25, 1962  F. R. MURPHY  3,055,449
MOTORIZED PACK AND GAME CART
Filed Dec. 2, 1959  2 Sheets-Sheet 2
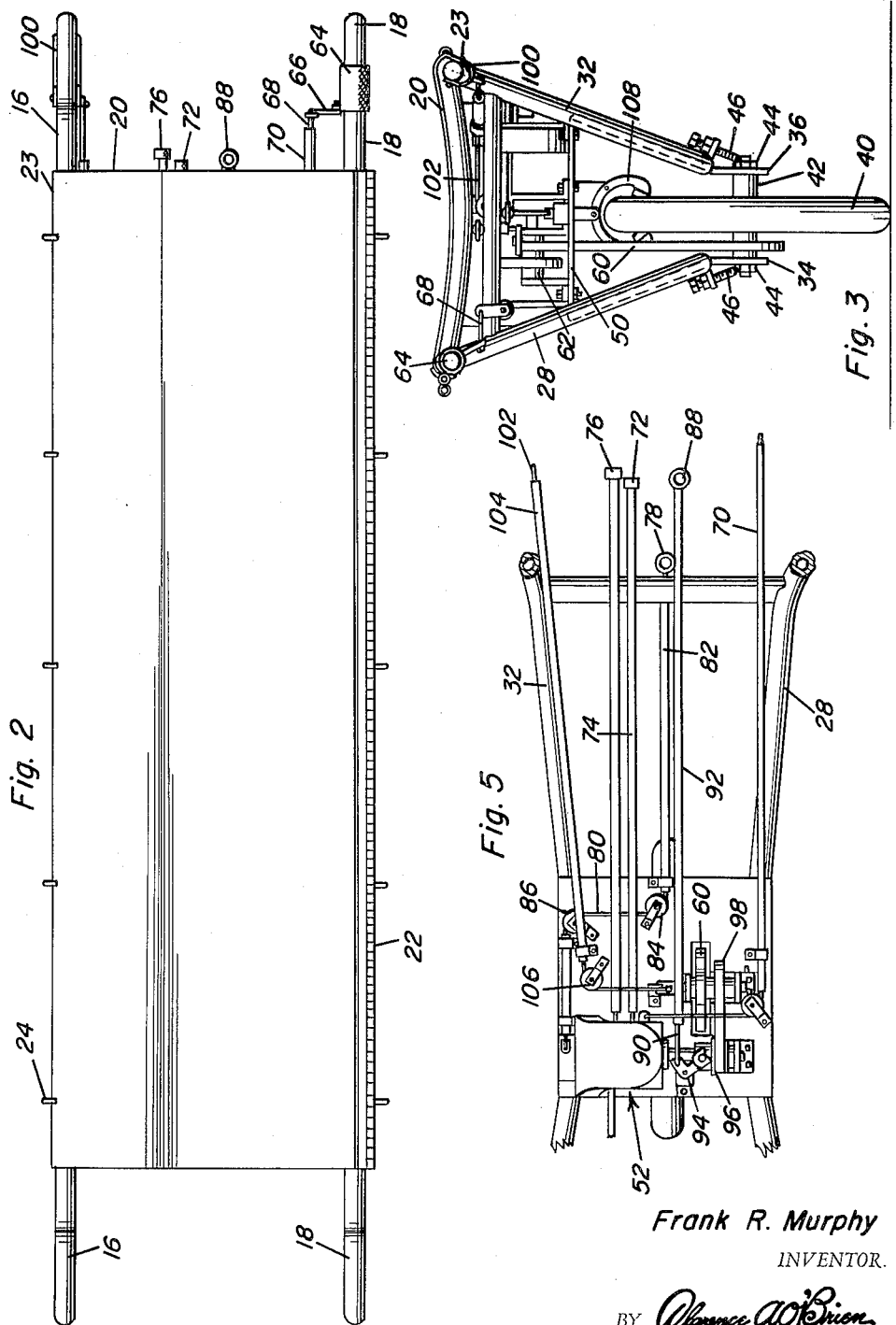
Frank R. Murphy
INVENTOR.
BY Clarence A. O'Brien
and Harvey B. Jacobson
Attorneys

Patent text

3,055,449
MOTORIZED PACK AND GAME CART
Frank R. Murphy, 808 E. 16th St., The Dalles, Oreg.
Filed Dec. 2, 1959, Ser. No. 856,700
2 Claims. (Cl. 180—19)

This invention relates generally to hunting equipment and more particularly to a cart construction particularly adapted for transporting game or hunting and camping equipment which includes a power supply for driving a single supporting wheel.

It is the principal object of this invention to provide a cart or vehicle for replacing the pack horse. Hunters and fishermen often find it difficult to transport equipment and game in rough country. Therefore, pack horses were always utilized to move equipment over logs, across small streams, and in rocky terrain. The device particularly disclosed below eliminates the necessity of utilizing horses.

It is a further object of this invention to provide a novel cart construction which may be utilized for reliably transporting equipment over rough terrain. A single wheeled cart is provided with an internal combustion engine mounted on the cart for driving the single wheel. The cart is so constructed that persons may stand or walk adjacent the cart so as to balance it with the engine driving the supporting wheel for providing the motivating power.

It is a still further object of this invention to provide a novel motorized cart construction which is relatively inexpensive to manufacture and utilize and which facilitates movement of heavy equipment through rough country.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 1 is an elevational side view of the motorized pack and game cart;
FIGURE 2 is a top plan view of the cart;
FIGURE 3 is an elevational front view of the cart construction;
FIGURE 4 is a bottom plan view of the cart construction; and
FIGURE 5 is a fragmentary horizontal sectional view taken below the upper bed of the cart and illustrating particularly the arrangement of elements on the supporting shelf.

With continuing reference to the drawings, the numeral 10 generally represents the cart construction including an upper bed portion 12 and a lower drive portion 14.

The upper bed portion includes a pair of opposed upper elongated side bars 16 and 18 having sheet material 20 secured therebetween. The sheet material 20 may be of sheet steel or such and the other structural members of the cart may also be constructed of steel or, if weight is to be a significant factor, they may be sturdily constructed of aluminum or such. The sheet material 20 may be hinged to the side bar 18 at one side with a piano type hinge as at 22 for the purpose of gaining access to the space therebeneath. At the other side the sheet material is bent as at 23 to hook around bar 16. Eyes 24 are secured to each of the side bars 16 and 18 so as to provide convenient lashing posts for securing equipment and game on the sheet material 20. Slots are provided in the bent portion 23 which allow eyes 24 to extend therethrough. It is further to be noted that the sheet material 20 is preferably slightly arcuate with the low point thereof being centrally located so as to enable equipment to be more securely carried by the cart.

A first pair of depending arms including arms 26 and 28 is secured to the side bar 18. A second pair of depending arms including arms 30 and 32 is secured to the side bar 16. The arms are curved and converge downwardly thereof toward a common point in alignment with the center of the sheet material 20. A first plate 34 joins the arms 26 and 28 while a second plate 36 joins the arms 30 and 32. Each of the plates 34 and 36 is provided with a vertical slot 38 extending upwardly from the lower edge thereof. A supporting wheel 40 is rotatable relative to a bearing 42 with the bearing 42 being secured by nuts 44 to the plates 34 and 36. It will be apparent that the bearing 42 is vertically adjustable relative to the plates 34 and 36. Screws 46 are supported on each of the plates 34 and 36 for adjusting, within the slot 38, the level of the axle housing 42 relative to the plates. The plates 34 and 36 extend vertically and are bridged by a shelf 50 formed integral therewith.

The shelf 50 is horizontally supported between the depending arms 26, 28, 30 and 32. A power supply in the form of an internal combustion engine 52 is bolted to the shelf 50 while a fuel tank 54 is welded to the arms 26 and 30. A fuel line 56 having a petcock valve 58 interposed therein connects the fuel tank 54 with the internal combustion engine 52. A tension belt 60 is driven by a shaft 62 of the internal combustion engine 52 and the tension belt 60 is in turn drivingly connected to a pulley secured to a spindle fixed to the wheel 40 within the axle or spindle housing 42. Therefore, it will be apparent that the internal combustion engine 52 may drive the wheel 40 through belt 60.

Control means are provided at the rear end of the sheet material 20 for controlling the operation of the internal combustion engine 52. Initially, a rotating sleeve 64 is supported on the side bar 18 with a link 66 pivotally connected thereto. The link 66 in turn is secured to the wire 68 of a Bowden cable or such 70 and in turn is connected to the throttle control of the internal combustion engine 52. Another control 72 likewise utilizes a Bowden cable 74 and in turn is connected to the choke control of the internal combustion engine 52. As in most internal combustion engines, in order to terminate operation thereof, it is preferable to ground the voltage to the spark plugs and accordingly a control at 76 is provided for eliminating the spark in the internal combustion engine 52. If an electric starter is not provided, a recoil starter control may be mounted as at 78 with the cable 80 extending through a housing 82 and about pulleys 84 and 86. The control 88 likewise is positioned at the rear of the cart and is connected to a cable 90 extending through a housing 92 for operating a clutch as at 94 for controlling the operative connection between the internal combustion engine 52 and the support wheel 40. It will be apparent that the internal combustion engine 52 may drive the pulley 96 upon engagement of the clutch 94 so as to drive the belt 98 and belt 60. A lever 100 is pivoted on the side bar 18 and secured to a cable 102 extending through the housing 104 and about a pulley 106. The cable 102 is in turn operatively connected to brake shoes 108 pivotally supported proximate the wheel periphery. The brake shoes may be frictionally engaged with the wheel 40 upon actuation of the lever 100.

In use, a person will walk on either end of the sheet material 20 between the side bars 16 and 18 so as to balance the cart 10 on the single wheel 40. By proper manipulation of the controls at the rear end of the cart, the supporting wheel 40 and cart 10 may be driven in the desired manner. It is contemplated that a three horsepower engine be utilized but, of course, the desirable engine rating will depend upon the cart dimensions and the contemplated load to be carried. Of course, it will be appreciated that when not being utilized, the cart may be easily transported on the top of of a motor vehicle.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention as claimed.

What is claimed as new is as follows:

1. A motorized pack and game cart comprising two elongated and generally parallel side by side frame members, said frame members defining a generally horizontal plane when the cart is in operative position, side frames connected to each of said frame members and extending downwardly therefrom, an axle connected between lower ends of said side frames, a relatively large wheel rotatably mounted on said axle, a motor mount above said wheel connected to said side frames, a power plant secured to said mount above said wheel and having a drive shaft parallel to said axle, a rigid load carrying platform shorter than and extending between said frame members above said power plant, hinge means parallel to one of said frame members and pivotally connecting said platform to said one of said frame members and releasable means operatively connecting the platform to the other frame member whereby said platform may support a load to be carried by said cart when the platform is extending between said frame members and may be pivoted upwardly for gaining access to said power plant, said drive shaft of said power plant being connected to said wheel by an endless belt, said axle being releasably connected to said side frames and adjusting means connected to said axle for adjusting the distance from said power plant for varying the tension in said belt, the ends of said frame members extending beyond the ends of said platform and providing two pairs of spaced gripping handles, the space between each of said handles being sufficient to accommodate an operator.

2. A cart as defined in claim 1 wherein each of said side frames includes a pair of legs, one leg of each pair being substantially S-shaped and the other leg being substantially reverse S-shaped, and said platform having an upper concave surface.

References Cited in the file of this patent

UNITED STATES PATENTS

| | | |
|---|---|---|
| 899,746 | Levedahl | Sept. 29, 1908 |
| 2,239,122 | Stokes | Apr. 22, 1941 |
| 2,546,604 | Lafky | Mar. 27, 1951 |
| 2,567,423 | Cleghorn | Sept. 11, 1951 |
| 2,656,894 | Giovannoni | Oct. 27, 1953 |
| 2,663,376 | Curley | Dec. 22, 1953 |
| 2,761,690 | Bradley | Sept. 4, 1956 |
| 2,918,296 | Goodale | Dec. 22, 1959 |

FOREIGN PATENTS

| | | |
|---|---|---|
| 470,589 | Great Britain | Aug. 18, 1937 |
| 379,572 | Germany | Aug. 24, 1923 |

OTHER REFERENCES

"Powered Duffle Carriers," Equipment Development Report No. 45, March 1957; Forest Service, U.S. Dept. of Agriculture.